United States Patent [19]
Gage et al.

[11] Patent Number: 5,923,846
[45] Date of Patent: *Jul. 13, 1999

[54] METHOD OF UPLOADING A MESSAGE CONTAINING A FILE REFERENCE TO A SERVER AND DOWNLOADING A FILE FROM THE SERVER USING THE FILE REFERENCE

[75] Inventors: Bruce Gage, Renton; Lindsay Harris, Bothell; Sean Nolan, Issaquah, all of Wash.

[73] Assignee: Microsoft Corporation, Redmond, Wash.

[*] Notice: This patent issued on a continued prosecution application filed under 37 CFR 1.53(d), and is subject to the twenty year patent term provisions of 35 U.S.C. 154(a)(2).

[21] Appl. No.: 08/590,106

[22] Filed: Nov. 6, 1995

[51] Int. Cl.⁶ .......................... G06F 13/00; H04M 11/00
[52] U.S. Cl. .................. 395/200.43; 395/200.3; 395/200.36; 395/200.47; 395/683; 379/93.12; 379/93.25
[58] Field of Search .................. 395/200.01, 200.03, 395/200.08, 200.09, 610, 500, 200.3, 200.36, 200.43–200.48, 200.57–200.59, 680, 683; 379/93.94, 96–98

[56] References Cited

U.S. PATENT DOCUMENTS

| | | | |
|---|---|---|---|
| 5,230,051 | 7/1993 | Quan | 395/680 |
| 5,339,392 | 8/1994 | Risberg et al. | 345/333 |
| 5,347,632 | 9/1994 | Filepp et al. | 395/200.32 |
| 5,379,340 | 1/1995 | Overend et al. | 379/93.24 |
| 5,530,852 | 6/1996 | Meske, Jr. et al. | 395/200.36 |
| 5,550,977 | 8/1996 | Hiraizumi | 395/200.43 |
| 5,572,643 | 11/1996 | Judson | 395/200.48 |
| 5,634,129 | 5/1997 | Dickinson | 395/683 |
| 5,682,430 | 10/1997 | Kilian et al. | 380/30 |
| 5,694,546 | 12/1997 | Reisman | 395/200.47 |
| 5,715,466 | 2/1998 | Flanagan et al. | 704/5 |
| 5,727,048 | 3/1998 | Hiroshima et al. | 379/93.12 |

*Primary Examiner*—Krisna Lim
*Assistant Examiner*—Bharat Barot
*Attorney, Agent, or Firm*—Leydig, Voit & Mayer, Ltd.

[57] ABSTRACT

A system for posting and downloading messages and files from a bulletin board system is described. The system allows a user to retrieve a message from a bulletin board system and then selectively download files which are represented within the message as objects, which may be visually presented to a user as icons.

32 Claims, 7 Drawing Sheets

METHOD OF UPLOADING A MESSAGE CONTAINING A FILE REFERENCE TO A SERVER AND DOWNLOADING A FILE FROM THE SERVER USING THE FILE REFERENCE

BACKGROUND OF THE INVENTION

1. Field of the Invention

The present invention relates to bulletin board services on computer networks and, more specifically, this invention relates to on-line bulletin board services having object-oriented file handling features.

2. Description of the Related Technology

Bulletin board services, or BBSS, are systems that allow users to post and download public messages. These bulletin board services normally have many different file libraries and discussion groups so that clients can communicate with one another through an on-line connection. In addition, bulletin board services can be provided as part of large on-line networks such as the Microsoft® Network (MSN).

For example, CompuServe, America On-Line, Prodigy and many other large network systems have bulletin board services as integrated features. Users of these network systems can post messages to various groups within the bulletin board service so that many different clients can read their message. For example, a client may post a message to the bulletin board service requesting information on a particular software program. Other users of the network service will read this message and can respond by posting messages of their own which include an answer. All of these messages are publicly available and can usually be read by any user.

Since a large number of users can post thousands of messages, the bulletin board service is divided into separate groups based on different subjects. For example, one group may contain discussions of computer software, while another group may be for discussions of classical music. The bulletin board service that is provided within the Internet contains thousands of various discussion groups on a wide range of issues.

Aside from posting messages to a bulletin board service, many users also exchange computer programs and data files by posting them to the publicly available BBS along with their messages. In this manner, the posted software is available to potentially millions of other clients who can download and retrieve the posted data file. Many different types of shareware files are distributed this way through a BBS.

Unfortunately, many bulletin board systems do not have convenient file handling capabilities. Within many systems, a client wishing to post a file must send a message that includes directions for finding the file within the BBS and then separately upload the data file. One example of a direction within this type of message might be to look for the file within a particular download directory in the online network. This method of sending and retrieving files is very inconvenient because it requires the client to first read the posted message and then switch programs to search a file download directory to find the desired program.

Other bulletin board systems embed the shareware file within the message itself. For example, a data file can be inserted within the body of the BBS message after being encoded with a program such as UUENCODE. The encoding software converts the data file into characters that can be inserted into the body of the message. The encoded data file is transmitted as if it was text within the message. If a user wishes to download the program, the entire message, containing the encoded file is sent to the client's computer where the program can be decoded from the message and saved to the client's hard disk. Unfortunately, this system forces the user to transfer an enormous file along with any message. There is no provision for first reading the message and then determining to download the file or not. In some cases, these large messages may take up to an hour to download to the client computer.

Other types of computer programs, such as electronic mail (Email) systems allow users to embed objects within the mail messages. One such system is the Microsoft® Mail program. However, Email programs such as Microsoft® Mail do not allow files to be selectively downloaded through a publicly accessible location on a computer network. Furthermore, the Internet community has submitted a proposal for a Multipurpose Internet Mail Extension (MIME, RFC 1521) to allow direct embedding of various data typed files in messages. However, such a system requires the raw data to be encoded before uploading to the network and, in addition, the size of the message is of the same order as the data being embedded. For all of the above reasons, a need exists for a bulletin board system which has convenient file handling capabilities.

SUMMARY OF THE INVENTION

One aspect of the present invention is a method for storing and retrieving a message to a publicly accessible location on a computer network, including: creating a message including an object representative of a file; uploading the message to a publicly accessible location on the network; and downloading the message from the publicly accessible location to a client computer.

Another aspect of the present invention is a computer network that includes a plurality of message groups, each group storing a plurality of messages; a first client computer connected to the network and including a program capable of including objects indicative of files in messages and transferring messages to the network; and a second client computer connected to the network and including a program capable of transferring messages from the network and selectively transferring files by selecting the included objects.

Still another aspect of the present invention is a process for retrieving a message on a computer network including: accessing a publicly available message group; displaying a message accessed from said message group on a client computer; and selecting an object representative of a file in said message wherein said selection causes the file to be downloaded to the client computer.

An additional embodiment of the present invention is a method for storing and retrieving a message to a publicly accessible location on a computer network, including: creating a message including an object representative of a file; uploading the message and file to a publicly accessible location on the network; storing the file and message in separate storage locations on said network; and downloading the message from the publicly accessible location to a client computer independently of the file.

Yet another aspect of the present invention is a method of transferring a data file from a network, comprising the steps of: retrieving a message including an object from the network; displaying the message and an icon representative of the object; selecting the icon; displaying object information relating to the file in response to the selecting; and transferring the file from the network in response to the displayed object information.

Still another aspect of the present invention is, in a messaging system, a method of saving a message referring to a file of non-text data type to a network, comprising the steps of: providing a file, at least a portion of the file comprising a non-text data type; inserting a link to the file in a message; sending the message and the file to the network; and saving the message in a publicly accessible location on the network.

DETAILED DESCRIPTION OF THE PREFERRED EMBODIMENT

Reference is now made to the drawings wherein like numerals refer to like parts throughout. For convenience, the following description will be organized into the following principle sections: Object Linking and Embedding Background, Advantages of the BBS, Bulletin Board System Overview, Architectural Overview, System Operation and Conclusion.

I. OBJECT LINKING AND EMBEDDING BACKGROUND

One aspect of the present invention is the use of embedded Object Linking and Embedding (OLE) objects within a BBS message. The following discussion provides background on the OLE architecture. While OLE, available by license from Microsoft Corporation, is the presently preferred object architecture, it will be understood that other architectures could be used such as, for example, Open Doc available from the Open Doc Consortium.

The OLE Structured Storage model defines two types of storage elements: storage objects and stream objects. The operating or file system itself generally implements these objects; applications rarely, if ever, need to implement them. These objects, like all others in OLE, implement interfaces: IStream for stream objects, IStorage for storage objects.

A stream object is the conceptual equivalent of a single disk file. Streams are the basic file system component in which data lives with each stream having access rights and a single seek pointer. Through its IStream interface, a stream can be told to read, write, seek, and perform a few other operations on its underlying data. Streams are named by using a text string and can contain any internal structure because they are simply a flat stream of bytes. In addition, the functions in the IStream interface map nearly one-to-one with standard file-handle-based functions such as those in the ANSI C/C++ run-time library.

A storage object is the conceptual equivalent of a directory. Each storage, like a directory, can contain any number of substorages (subdirectories) and any number of streams (files). Furthermore, each storage has its own access rights. The IStorage interface describes the capabilities of a storage object, such as enumerate elements (dir), move, copy, rename, create, and destroy. A storage object itself cannot store application-defined data except that it implicitly stores the names of the elements (storages and streams) contained within it.

Storage and stream objects are sharable between processes. This enables objects running in-process or out-of-process to have equal incremental access to their on-disk storage. Because OLE is loaded into each process separately, it must use some operating-system-supported shared memory mechanisms to communicate between processes about opened elements and their access modes. In that way, storage itself becomes another mechanism—an interface-based mechanism—for shared memory. In fact, OLE uses a shared stream implemented on top of shared memory to pass parameters and return values between proxy and stub objects when generating remote procedure calls.

Application design with structured storage

OLE Structured Storage makes it much easier to design applications that by their nature produce structured information. For example, consider a "diary" program that allows a user to make entries for any day of any month of any year. Entries are made in the form of an object that itself manages some information. Users wanting to write text into the diary would store a text object; if they wanted to save a scan of a newspaper clip they would use a bitmap object, and so forth.

Without a powerful means to structure information of this kind, the diary application might be forced to manage a very large file structure with an overabundance of seek pointers.

In this kind of situation, even a small change in the size of a text object or an addition of a day or month might precipitate changes throughout the rest of the file to update seek offsets. Not only is this tedious to manage, but the application also would have to spend enormous amounts of time moving information around in the file to make space for data that expands. Or the application can move the newly enlarged data to the end of the file and patch a few seek offsets, but that introduces the whole problem of managing the free space created in the middle of the file to minimize waste as well as overall file size.

The problems are compounded further with objects capable of reading and writing their own information to storage. In the example here, the diary application would prefer to give each object in it—text, bitmap, drawing, table, and so on—its own piece of the file to write whatever the object wants. The only practical way to do this with a single, flat file is for the diary application to ask each object for a memory copy of what the object would like to store, and then the diary would write that information into a place in its own file. While this works reasonably well for small amounts of data, consider an object that wants to store a 10-MB bitmap scan of a true-color photograph—exchanging that much data through memory is horribly inefficient. Furthermore, if the user wants to later make changes to that bitmap, the diary would have to load the bitmap in its entirety from its file and pass it back to the object.

The OLE Structured Storage technology solves these problems through the extra level of indirection of a file system within a file. With OLE, the diary application can create a structured hierarchy where the root file itself has substorages for each year in the diary. Each year substorage has a substorage for each month, and so on.

This structure solves the problem of expanding information in one of the objects: The object itself expands the streams in its control, and the implementation of storage determines where to store all the information in the stream. The diary application doesn't have to perform any specific routines. Furthermore, the implementation automatically manages unused space in the entire file, again relieving the diary application of a great burden.

In this sort of storage scheme, the objects that manage the content in the diary always have direct incremental access to their piece of storage. That is, when the object needs to store its data, it writes it directly into the diary file without having to involve the diary application itself. The object can, if it wants to, write incremental changes to that storage, thus leading to much better performance.

If the user wants to make changes to that information later on, the object can then incrementally read as little information as necessary instead of requiring the diary to read all the information into memory first. Incremental access, a feature that has traditionally been very hard to implement in applications, is now the default mode of operation.

Direct access versus transaction access

Storage and stream elements support two fundamentally different modes of access; direct mode and transacted mode. Changes made while in direct mode are immediately and permanently made to the affected storage object. In transacted mode, changes are buffered so they can be saved ("committed") or reverted when modifications are complete.

If an outermost-level IStorage is used in transacted mode, a robust two-phase commit operation is used to publish those changes to the underlying file on the file system. That is, great pains are taken not to lose the user's data should an untimely crash occur.

Persistent objects

Because OLE allows an object to read and write itself to storage, there must be a way through which the client tells objects to do so. The way is, of course, additional interfaces that form a storage contract between the client and objects. When a client wants to tell an object to deal with storage, it queries the object for one of three interfaces, as suits the context:

IPersistStorage: Object can read and write its persistent state to a storage object. The client provides the object with an IStorage pointer through this interface. This is the only IPersist* interface that includes semantics for incremental access.

IPersistStream/IPersistStreamInit: Object can read and write its persistent state to a stream object. The client provides the object with an IStream pointer through this interface.

IPersistFile: Object can read and write its persistent state to a file on the underlying system directly. This interface does not involve IStorage or IStream unless the underlying file is itself accessed through these interfaces, but the IPersistFile itself has no semantics relating to such structures. The client simply provides the object with a filename and orders to save or load; the object does whatever is necessary to fulfill the request.

As will be discussed in the following sections, OLE technology is used as a mechanism to provide some of the advantages of the present invention.

II. ADVANTAGES OF THE BBS

The bulletin board system of the present invention allows a user to conveniently upload and download files to a publicly accessible location on a computer network. As used herein, a publicly accessible location may be implemented in a bulletin board system wherein individuals can post messages to the networked public. This can be distinguished from, for example, an electronic mail system wherein individual messages are sent from one person to another individual, but are not posted for review and comment by the networked public.

In the present invention, OLE technology is used to include objects representing files within the body of a BBS message. Specifically, a user can insert an icon representative of a file within the body of a message to be posted while the file remains in a separate location on the client computer. Because the embedded object retains a link to the associated file, when the message is posted to the bulletin board system the file is automatically transmitted along with the message. However, this system does not suffer from the disadvantages of prior bulletin board systems because the actual file is not embedded within the body of BBS message.

Posting a Message

Several advantages exist in the present invention for posting a message to a bulletin board service. In practice, by the use of OLE technology, the user can "drag and drop" a file into the body of a message. Once the user has placed an icon representing the file to be posted within the body of the BBS message, the system of the present invention efficiently handles sending that file to the publicly accessible BBS server for storage and retrieval by other users. The user is not required to encode or decode files as within other BBS systems. In addition, the actual file itself is not included within the message, only an embedded object which retains a link to the file. This provides a tremendous advantage when retrieving the file as will be discussed below.

In addition, the system of the present invention can compress and decompress the posted file without the user having to run external programs such as PKZIP® available from PKWARE Incorporated. The automatic file compression features of the present invention dramatically increase the speed of uploading files from a client computer to the BBS system.

Retrieving a Message

The system of the present invention is very convenient for browsing through many messages to find a data file having a particular data type or types, e.g., text document, image, animation, audio, etc., to be downloaded. Since the actual files remain resident on the BBS system, even after a message is sent to a client computer, the speed of this system is much greater than those seen in the prior art. For example, a BBS message which includes relatively small embedded objects representing a data file could be retrieved by a user very quickly since the potentially very large data file remains on the server.

However, a BBS message such as those found in the prior art which includes the actual file stored within the body of the message might take up to an hour to be retrieved by the user. As can be imagined, the user would not be able to read the message until the file download was completed. The user of prior art systems is forced to wait for all embedded data files to be retrieved before being able to read the BBS message. Thus, prior art systems are very slow and difficult to use.

In contrast, when a user of the present invention retrieves a message, all that is sent is the text of the message and the small embedded objects which retain a link to their associated data file. A user can read the entire message and then select one or more files represented by the embedded objects to be specifically downloaded. The capability of having multiple files embedded within the body of the message is also unique, since most prior bulletin board systems only allowed for a single file to be embedded within the message body. For all of the reasons mentioned above the bulletin board system of the present invention provides many advantages over prior art systems.

III. BULLETIN BOARD SYSTEM OVERVIEW

The Bulletin Board System of the present invention provides users with a way to ask and answer questions, create and read answers to questions, find information, and hold non-realtime discussions with other BBS users interested and/or knowledgeable in the same topics. Bulletin boards are usually organized by topic so that users with similar interests can interact with one another. Individual bulletin boards are also called groups or newsgroups. Sub-topics of a newsgroup are called threads.

A thread is a collection of messages organized chronologically and hierarchically to reflect the flow of a discussion between users. A message is an individual posting to the bulletin board.

In the presently preferred embodiment of the present invention, the bulletin board system is a component of the Microsoft® Network. However, it will be understood that other networks such as, for example, the Internet, may be utitlized in conjunction with the present invention. The bulletin board service is accessible on a client computer by implementing features extending the functionality of the Microsoft Windows 95® Explorer, using the Windows 95 tree navigation application program interface (API) in conjunction with the Microsoft On-line System (MOS) transport, and using a High Performance Message System (HPMS) backend.

The MOS bulletin board service, which executes on a BBS server located in a host data center, preferably includes a large in-memory cache to increase message throughput. The BBS server preferably runs under the Windows NT operating system available from Microsoft Corporation. Preferably, the BBS server is a Pentium-class (or better) microcomputer with at least 128 MB of random-access memory (RAM) and at least 4 Gigabytes of hard disk space.

The bulletin board system supports at least two types of BBS folders: public and private. Public folders are used for generally available newsgroup folders, such as those that are available to all users on the on-line network. Private folders are used for communication restricted in some way, such as folders created for personal correspondence among families and friends.

IV. ARCHITECTURAL OVERVIEW

Figure 1:
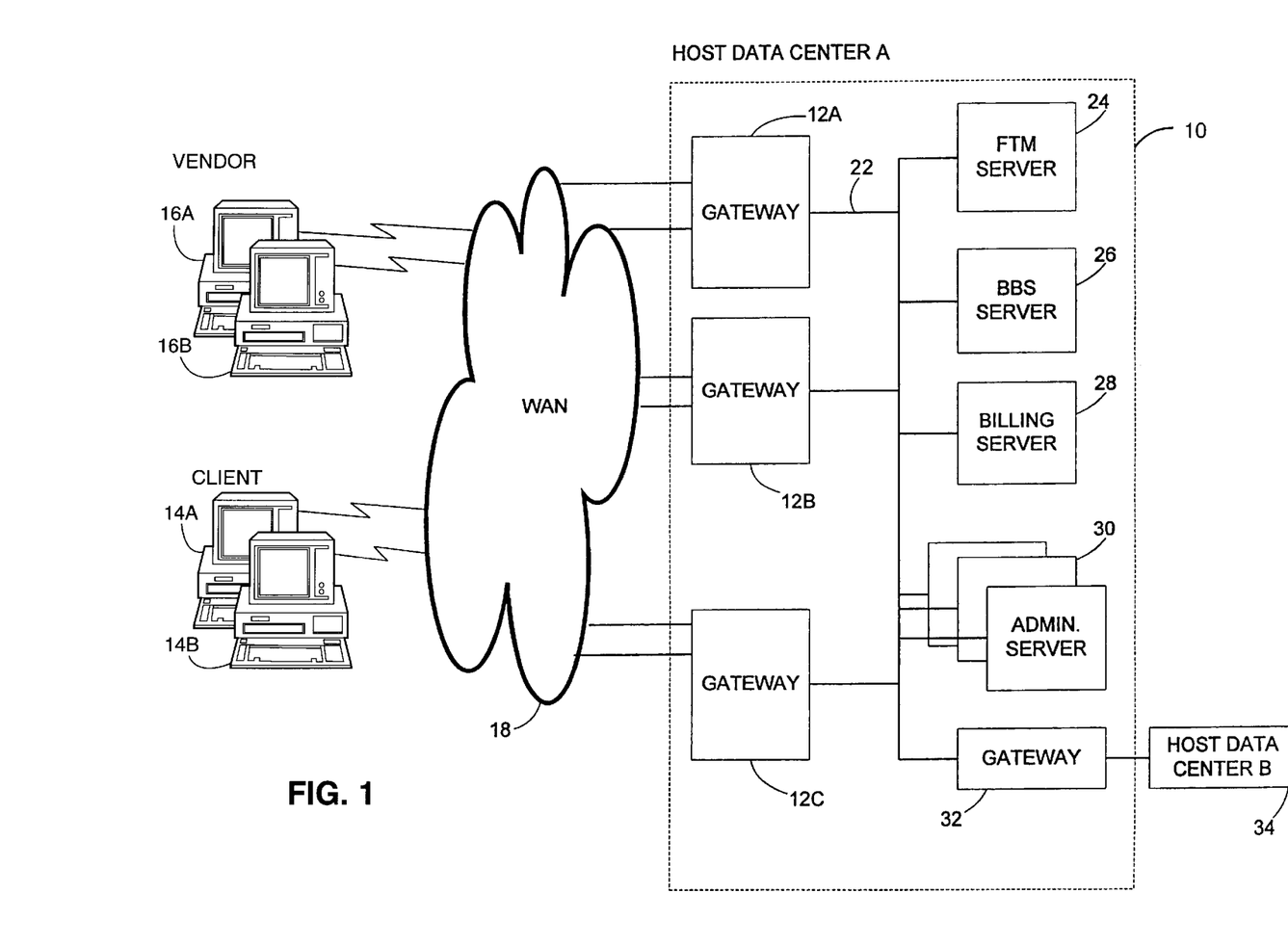
FIG. 1 is an block diagram of the bulletin board system and illustrates clients, vendors and a host data center.

FIG. 1 illustrates a high level diagram of the general architecture of the bulletin board service in accordance with the present invention. A host data center 10, which houses a network of many computer systems and servers, is shown having a plurality of gateways 12. These gateways provide a linkage between the host data center 10 and a set of clients 14a, 14b and vendors 16a, 16b. The clients and vendors communicate through a wide area network (WAN) 18 to the gateways 12 within the host data center 10. The WAN lines are provided by one or more telecommunications companies and allow clients over a wide geographic area to access the host data center 10. The WAN preferably includes both X.25 lines and Integrated Service Digital Network (ISDN) lines.

The gateways 12 and other computers within the host data center 10 communicate with one another through a series of high speed network cables 22. These network cables can include twisted pair, coaxial cable or fiber optic products. However, the most preferable network cables are 100 Megabit per second fiber optic communication lines.

As illustrated in FIG. 1, the gateways 12 communicate with a file transfer manager (FTM) server 24 through the network cables 22. The FTM server 24 is responsible for handling file transfers between other servers within the host data center 10 and the vendor and client computers that are linked through the gateways. For example, a bulletin board server 26 is shown as linked to the FTM server 24 and gateway 12a through the network 22. The network 22 can also communicate between a billing server 28, administration servers 30 and another gateway 32 which provides access to a second host data center 34.

Figure 2:
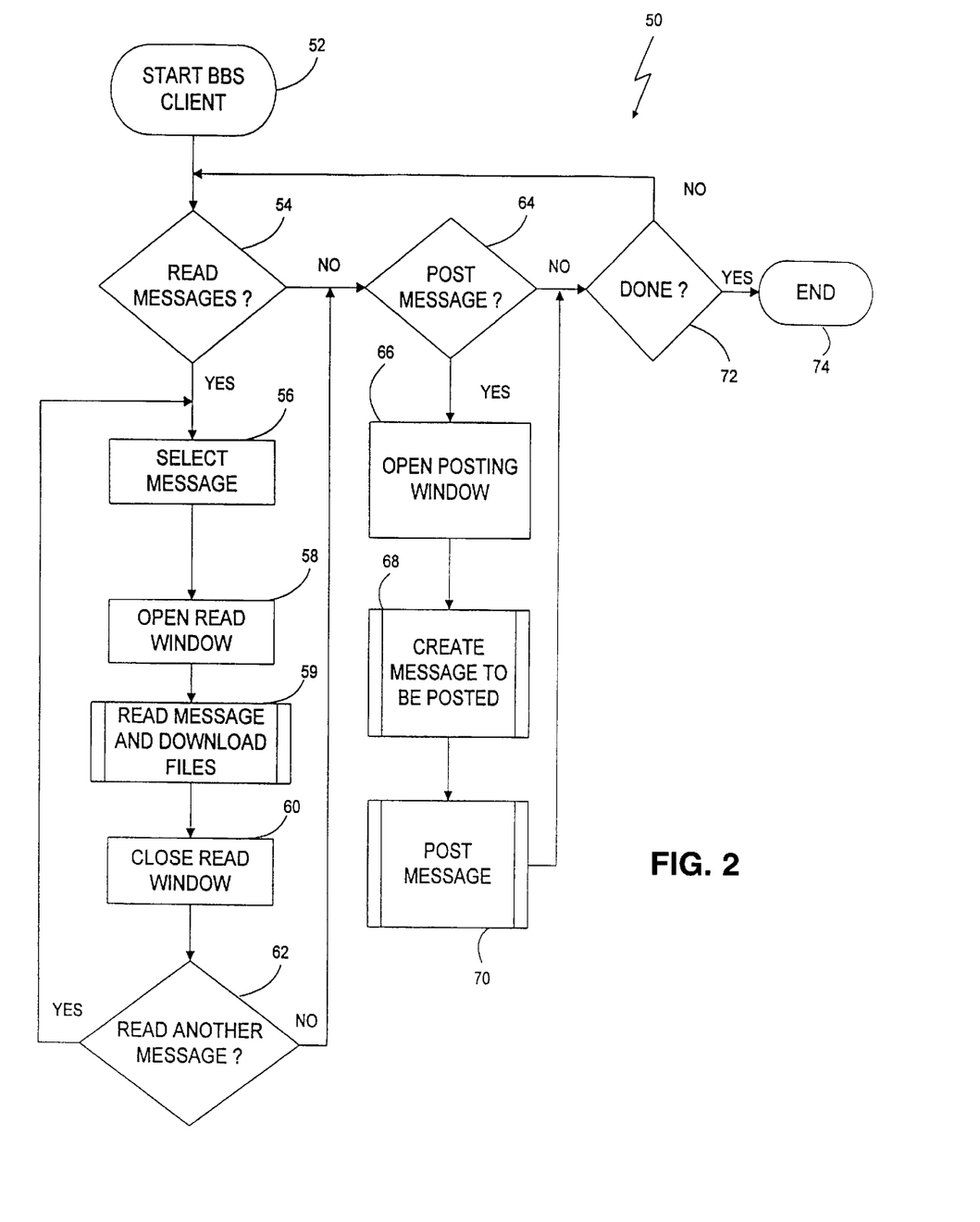
FIG. 2 is a flow diagram illustrating an overview of the bulletin board system.

The client side of the BBS system includes software for reading and posting messages to and from a publicly accessible location on a computer network. The on-line services offered to the clients 14 are preferably in the form of client server application programs or "service applications". Each service application includes a server portion that runs on one or more servers within the host data center 10 and at least one corresponding client portion (also referred to as a "client application") that runs on a microcomputer of the client 14. In the presently preferred embodiment, the client applications for the bulletin board system are in the form of Microsoft Windows 95 executables, and the server portions are implemented as dynamic link libraries (DLLs) running under the Microsoft® Windows NT operating system. FIG. 2 is a flow diagram illustrating the process of starting a BBS client and reading and posting messages.

VI. SYSTEM OPERATION

As illustrated in FIG. 2, the BBS client begins operation on the client computer 14 at a start state 52. The BBS client software is preferably written in C++ and runs under the Microsoft Windows 3.1 or Microsoft Windows 95 operating system. It should be noted however that similar software can be programmed in different languages and designed to run under various operating systems and still be within the purview of the present invention.

When the BBS client starts at the state 52 a window opens on the client computer and lists the various messages that are available to be read. While in this browsing mode the user can scroll through many messages and select the one which is most appealing. Each message normally includes a subject line which indicates the subject matter of the posted message. Once the user has started the BBS client at state 52 a decision is then made at a decision state 54 whether or not to read a particular message.

If a choice is made to read a particular message at decision state 54 then that message is selected at a state 56. As is well known in the art, a message can be selected by highlighting it with a mouse and pressing the enter key, or double clicking on the selected message with a mouse button. While these commands are primarily used with the Windows Operating System, other methods of selecting messages might also be available. Once a particular message has been selected to be read at state 56, a read window is opened at a state 58.

In this system, the read window contains two separate areas known as the header and body sections of the message. The header section includes information such as the name of the person posting the message, the subject of the message and the date that the message was posted.

The body section of the message contains the text of the message itself along with any included object such as a picture, a sound or a video. This differs from many other BBS systems because objects can be embedded directly within the body section of the message. This will be explained more fully below in reference to FIG. 5.

Once the read window is opened at state 58 the user reads the message and downloads any desired files at a process 59 and then closes the read window at a state 60. The process of reading messages and downloading files is discussed in detail in reference to FIG. 6. Once the read window is closed, this message is normally marked within the BBS system as being read. The user can then choose to only view messages which have not been read while they are browsing the available messages. Once the read window is closed at state 60 an inquiry is made at a decision state 62 whether to read another message. If the decision is made to read another message, then the process 50 of reading and posting messages loops back to select a message at state 56. If a decision is made to not read another message at decision state 62 then the process 50 inquires whether to post a message at a decision state 64.

If a decision is made to post a new message at decision state 64, then a posting window is opened at a state 66 which resembles the read window discussed above. The posting window includes both header and body sections of the message that can be filled in by the user. Once the posting window is opened at state 66 a message is created for posting at process 68 when the user fills in the header and body sections of the message.

After the message is created at process 68, it is posted at process 70 so that it can be available for use on a publicly accessible location on a computer network. The process of posting messages from a client computer to the network is described more fully by reference to FIGS. 3 and 5. After the message has been posted at process 70, an inquiry is made whether the user is done at a decision state 72. If the user is not done, the process 50 loops back to inquire whether to read more messages at decision state 54. However, if the user is done at decision state 72, then the process 50 ends at an end state 74.

Creating a Message

Figure 3:
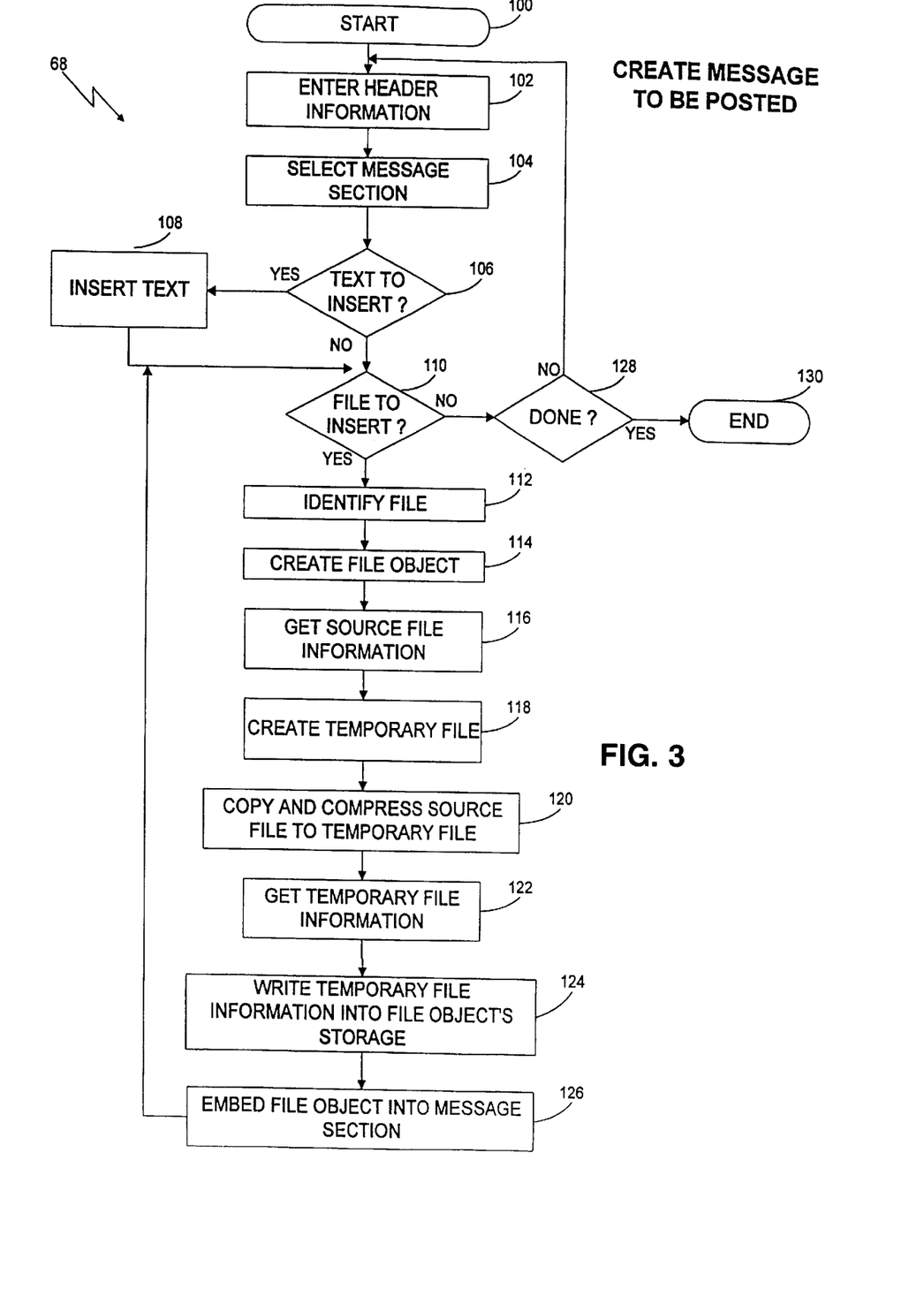
FIG. 3 is a flow diagram illustrating the create message to be posted process of FIG. 2.

The overall process of reading and posting messages has been described above in reference to FIG. 2. FIG. 3 details the process 68 of creating messages to be posted after a posting window has been opened. Referring now to FIG. 3, the process of creating a message to be posted 68 begins at a start state 100 and then moves to state 102 where header information is placed in the header section of the message.

As discussed above, header information in the presently preferred embodiment includes the name of the person posting the message, the subject of the message, and the date and time the message was posted. Once header information has been entered at state 102 the message section is selected at state 104 and an inquiry is made at decision state 106 whether to insert text into the message section. If the user wishes to add text into the message section then it is inserted at a state 108. Normally, a user will insert some text which makes up a part of the message being posted to a desired group. The process 68 then inquires whether a file exists to insert into the message section at a decision state 110. However, if there is no text to insert into the message at decision 106, the process 68 moves directly to inquire whether a file is to be inserted at decision 110.

If a decision is made to attach a file then the file is identified at a state 112 by the user. In practice, once a decision is made to attach a file the user chooses a button labeled, for example ATTACH, which would thereafter open a window requesting the identity of the file to be attached to the message. After the name of the file has been entered into the new window the user closes the window by clicking an "OK" button, for example.

Once the user has identified the file at state 112 a file object is created at state 114. Within the present invention the preferable object is known as MOSAF (Microsoft On-Line System Attach File). This object was designed to hold properties of the attached file which are later used for identifying the file within the message. The MOSAF object is derived from the Microsoft Foundation Class (MFC) and has properties shown in Table 1. A "class" as discussed herein is a definition of a data type that specifies the representation of objects of the class and the set of operations that can be applied to the objects. An object of a class is a region of storage or memory. The notion of a "class" will be understood by those skilled in the object-oriented programming technology and, in particular, by those familiar with the "C++" programming language. Classes may be more fully comprehended by reference to *The Annotated C++ Reference Manual*, Ellis, Margaret and Stroustrup, Bjarne, Addison-Wesley Publishing Co., 1990.

TABLE I

PROPERTIES OF MOSAF OBJECT

| PROPERTIES | DEFINITION |
|---|---|
| Compression Method | Compression method used to compress file: NONE, PKZIP, MSN INTERNAL |
| Version Number | Version of MOSAF used to create object |
| State | State of Object: UNSENT — created but not yet sent REMOTE — file has not been downloaded LOCAL — file has been downloaded |
| File Size | Size of compressed file to be sent or downloaded |
| Name Size | Size of name of file (not including a null terminator) |
| Attached File | Name of attached file |

The MOSAF object is an inprocess object server (DLL) and supports the IUnknown, IClassFactory, IPersistStorage, IOleObject, IDataObject and IViewObject interfaces as required by OLE. A custom interface, IMosAttachedFile, is defined for manipulating the file represented by the MOSAF object. This object exposes the following methods:

STDMETHOD(SetFile) (THIS_LPCSTR) PURE;

This method is used to indicate the file to be attached with this instance of the MOSAF object. In addition, the method validates the file name, separates the filename from its full path name, retrieves the file size and creates date/time data, opens the file and determines if the file has been compressed using PKZIP (by looking at whether the first two bytes of file contain the characters "PK"). If the file has not already been compressed, it is compressed into a temporary file, the new file size is determined, and the method writes the above file information to the object storage.

STDMETHOD(SetFileId) (THIS_DWORD,WORD, DWORD,DWORD) PURE;

This method is used to set the file ID of any attached files. The file ID is required to download a file. Because of the structure of the BBS server system, the file ID is not known by the client until the message is downloaded to the client machine. The file ID is derived from the message ID and the particular position of the file within the RichEdit control (available by license from Microsoft as part of the Win32 SDK). This will be explained in more detail below in reference to FIG. 7. Briefly, the ID of the first file in the RichEdit control is the message ID+1, the second is message ID+2 and so on. Thus, if the message ID was 1111, the first file ID would be 1112.

STDMETHOD(GetSizeOfFile) (THIS_LPDWORD) PURE;

This method is used by the BBS client to retrieve the size of the file before adding it to the message to be sent.

STDMETHOD(GetFileDataPtr) (THIS_LPVOID*) PURE;

This method is used by the BBS client to retrieve a pointer to the file data for adding to the message to be sent.

STDMETHOD(SetFileRemoteInfo) (THIS_FILETIME*, DWORD,DWORD,BOOL) PURE;

This method is used by the BBS client to set the price and the number of accesses for the file. Normally, this method is used on read.

STDMETHOD(GetFileName) (THIS_LPSTR,int) PURE;

This method is used by the BBS client to retrieve the original filename of the attached file. A list of attached filenames is generated for the BBS Save As dialog.

STDMETHOD (QueueFileForDownload) (THIS_HWND, LPSTR, BOOL) PURE;

This method is used by the BBS client to download an attached file through the File Transfer Manager (FTM) when a user has selected one or more attached files and clicks OK from the Save As dialog.

STDMETHOD(GetFileCompType) (THIS_LPINT) PURE;

This method is used by the BBS client to determine the file compression routine that was used to compress the attached file. These values can be NONE, PKZIP, or MSN INTERNAL.

The MOSAF object also supports three verbs: Open, Download and Properties where Properties is the default verb (i.e. used on double click). These verbs are defined below:

OPEN:

The open verb method first checks to see if there is any application associated with the attached file. The file extension is compared with the file extensions listed under HKEY_CLASSES_ROOT in the Object Linking and Embedding registry. If no associated application is found an error message is displayed telling the user this fact. If an associated application is found, and the state of the MOSAF object is UNSENT then the file is opened with the associated application (for example, Microsoft Word). If the state of the MOSAF object is REMOTE, then the file is first downloaded and then opened with the associated application.

DOWNLOAD:

The download verb method first checks the state of the MOSAF object. If the state is UNSENT then an error message is displayed notifying the user that the file cannot be downloaded because it has not been sent. If the state is REMOTE then it simply calls the QueueFileForDownload( ) method and initiates a file download.

PROPERTIES:

The properties verb displays the properties of the attached file and has two buttons, "Download and Open" and "Download". The first button maps to the OPEN verb and the second button maps to the DOWNLOAD verb.

The MOSAF object renders the file name and icon as a standard Windows Enhanced Metafile. This metafile is obtained using the OLE function GetIconOfFile( ).

Once the file object has been created at a state 114 the name of the source file is retrieved into the object at a state 116. In this manner, the file object is now linked to the source file by reference to its path and name. After the source file information has been retrieved at state 116 a temporary file is created at a state 118 and the source file is copied and compressed into the temporary file at a state 120.

Thus, a compressed copy of the original source file is now stored in a temporary file on the user's computer. The compression algorithm used to compress the source file into the temporary file is known as the DIAMOND compression system and is based on algorithms available within the Microsoft Corporation. However, it should be realized that many different types of file compression systems are available and could be used to compress the source file without departing from the present invention. Further, compression is not a necessary aspect of the present invention.

The source file is compressed into a temporary file at this state so that it may be uploaded to the network more efficiently during the posting process. This process will be explained in more detail in reference to FIG. 4. Once the temporary file contains the compressed source file at state 120, the temporary file information is retrieved from the temporary at a state 122.

After this temporary file information is known, it is written to the file objects storage at a state 124 and the file object is inserted into the message section at a state 126. It should be noted that the BBS system uses an OLE registry to match the attached files extension with the correct icon. For example, a file that has an extension ".DOC" will receive an icon indicative of the Microsoft Word word processing application. The OLE registry is part of OLE version 2.0.

Once the file object is inserted into the message section of the message at state 126, the process 68 returns to inquire at decision state 110 whether to insert another file or not. If a decision is made to not insert a file at decision state 110, then the process 68 inquires whether the user is done or not at a decision state 128. If the user is not done, then the process 68 returns to state 102 wherein header information can be entered. However, if the user is done at decision state 128 then the process ends at an end state 130.

Posting a Message

Figure 4:
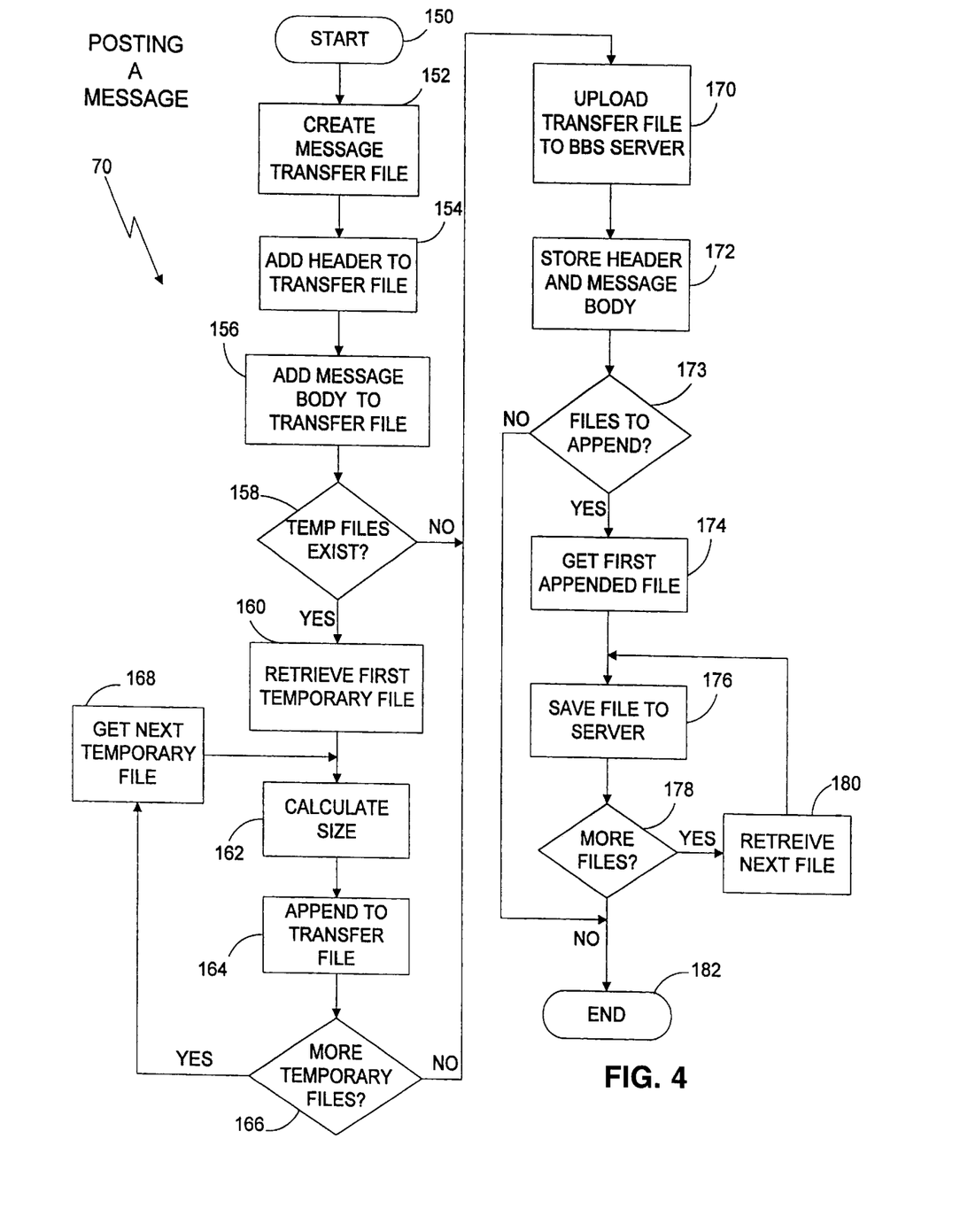
FIG. 4 is a flow diagram of the post message process of FIG. 2.

The process 70 of posting a message as shown in FIG. 2 is illustrated more completely in reference to FIG. 4. The posting process 70 begins at a start state 150 and moves to a state 152 where a message transfer file is created. The message transfer file is the data structure that is used to transfer the message and any attached objects to the network within the host data center 10. In this instance, the publicly accessible location is within the BBS server 26. The data structure of the message transfer file will be discussed in more detail below in reference to FIG. 5.

Once the message transfer file has been created, the header information from the message is placed within the message transfer file at a state 154. As discussed previously, header information includes the subject of the message, the date and time the message was posted, and the name of the person posting the message.

Once the header information has been placed within the message transfer file at state 154, the posting process 70 adds the body of the message to the transfer file at a state 156. As discussed above, the body section of the message is composed using a rich edit control which has the ability to output its data as a rich text format (RTF) stream. The RTF standard allows text and graphics, including font styles, emphasis, spacing and other features of the data within the control to be output in a standard form that retains all of the formatting commands. Thus, the data that is output in a rich text format can be recreated to include all of the appropriate graphics, objects and font styles.

After the header information has been placed within the message transfer file, the rich edit control sends a rich text format stream to the message transfer file using Messaging Application Programming Interface (MAPI) compression techniques. Compression is provided at this stage because the RTF stream contains many internal codes that represent font descriptions, font changes, tab settings, etc. The MAPI compression is used to reduce the size of the RTF stream so that file transfers will be more efficient. While MAPI compression is used in the preferred embodiment of the invention, other similar compression algorithms could also provide similar advantages. Furthermore, the present invention can be implemented without any compression of the message.

If objects have been placed within the body section of the message then the rich edit control interacts with those objects and gathers data from them. The data gathered from the objects is placed within the rich text format stream that is output to the message transfer file. The process of converting data from objects from a rich edit control into a rich text format stream can be understood more clearly with reference to Inside OLE 2 by Kraig Brocksschmidt (Microsoft Press). The command EM_Streamout is used from the OLE 2 command set to output rich text format from a RichEdit control.

Once the message body has been converted to a rich text format and placed within the message transfer file at state 156, an inquiry is made whether any objects which reference temporary files exist at a decision state 158. As discussed above in reference to FIG. 3, a temporary file is created when a file is attached to a particular message. The temporary file is a compressed version of the source file located on the user's local computer system.

If a determination is made at decision state 158 that temporary files do exist then the first temporary file is retrieved at a state 160. Once the temporary file has been retrieved at state 160 its binary size is calculated at a state 162 so that its boundaries within the message transfer file can be determined. The BBS server 26 within the host data center 10 can then use these binary size calculations to extract each attached file from within the message transfer file. This process will be explained more completely below in reference to FIG. 7.

Once the binary size of the attached file is calculated at state 162, the temporary file is appended to the end of the transfer file at a state 164. If more temporary files are determined to exist at a decision state 166, then the next temporary file is retrieved at a state 168 and a process begins again to calculate its binary size at state 162.

However, if no temporary files exist at decision state 166, or at decision 158, the posting process 70 begins uploading the transfer file 210 (from FIG. 5) to the BBS server at a state 170. Uploading the transfer file to the BBS server 26 normally involves sending the file from a user's computer 14 through the wide area network 18 and the gateway 12 to the Bulletin Board Server 26.

Protocols for sending files from an end user to a computer network are well-known within the art and can include protocols such as ZMODEM, YMODEM, or XMODEM. After the transfer file 210 has been uploaded to the BBS server 26 at state 170 the message transfer file is parsed into the message section 220 and the file sections 222 (from FIG. 5).

As part of state 170, the client 14 sends the size of the header and compressed RTF message and the binary size of each compressed, appended file to the BBS server 26. As this data is retrieved by the BBS server, it is placed into a temporary file, along with the incoming message transfer file. Thus, the BBS server temporary file contains the file from the client, plus the size of each appended file and the size of the header and compressed RTF stream. After the upload is complete, the server uses the file size information to divide the file into the header and compressed RTF, and finally all the appended files.

At state 172 the header and message body section of the message transfer file are stored to the BBS server. After the header and message body sections 220, 222, respectively have been stored, a query is made whether any appended files exist at a decision state 173. If some appended files exist, the first appended file is saved to the BBS server 26 at a state 174. As discussed above, the system saves the binary size of each appended file so that they can be extracted from the message transfer file intact.

After the appended file is saved to the server at a state 176, a query is made at a decision state 178 whether more appended files exist. If more appended files exist at decision state 178, then the next file is retrieved at a state 180 and the process 70 loops back to save the next file to the server at state 176. If no more files exist at decision state 178 then the posting process 70 ends at an end state 182. If no appended files exist at decision state 173, the process 70 terminates at end state 182.

Figure 5:
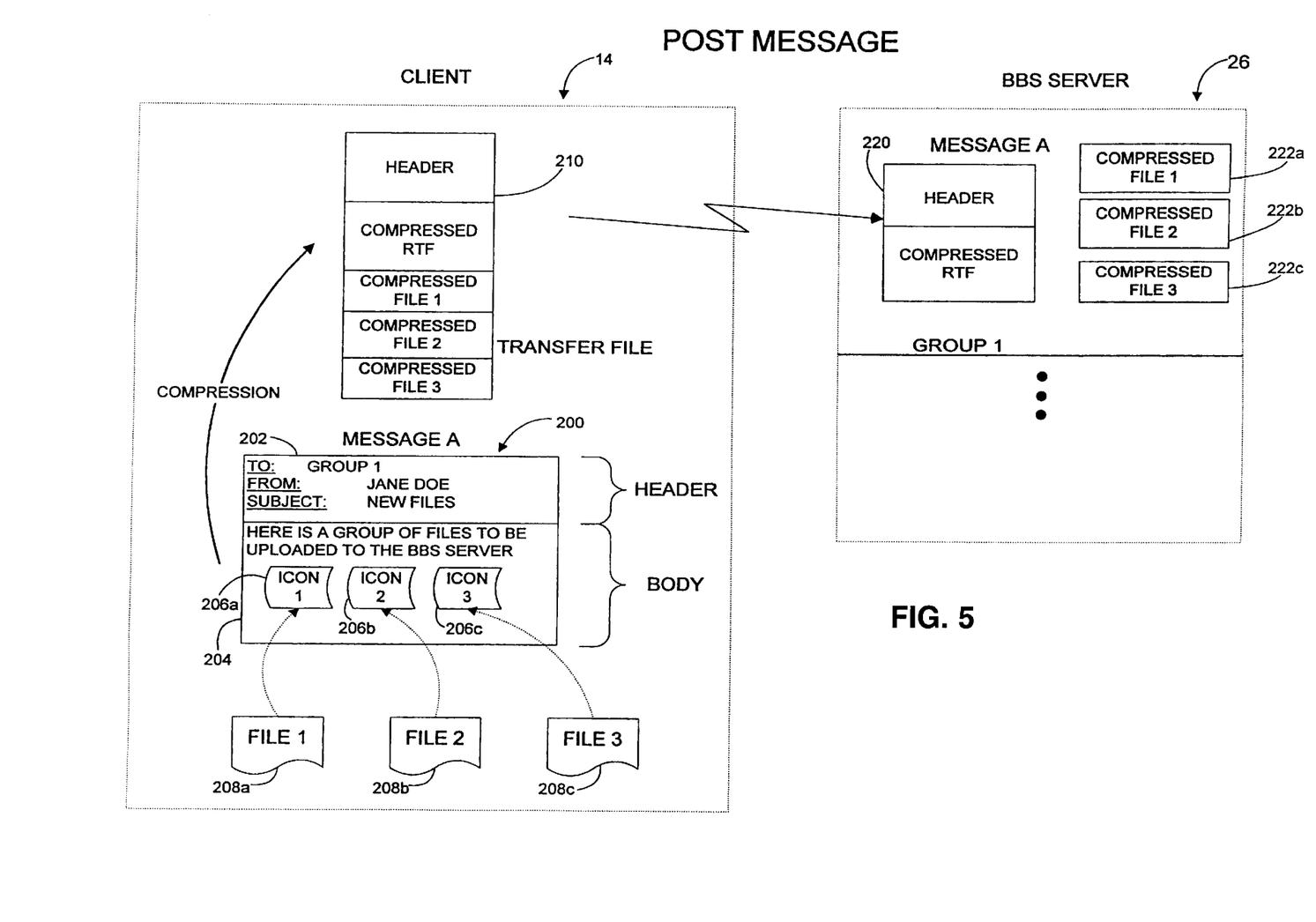
FIG. 5 is a block diagram showing the movement of data structures in the post message process of FIGS. 2 and 4.

FIG. 5 shows details of the data structures involved in posting a message from a client 14 to the BBS server 26. As shown, a message 200 has a header section 202 and a body section 204. The header section 202 includes information concerning which group will receive the message, who the message is from and the subject of the message. The body section 204 includes some text and a series of icons 206a, 206b, and 206c. The icons 206a, 206b, and 206c reference temporary files 208a, 208b, and 208c, respectively.

As part of the posting process a transfer file 210 is created as discussed above. Once the transfer file 210 has been created on the client system 14, the header information text corresponding to the header information is added into the transfer file 210. The compressed rich text format stream that is output from the body section 204 of the message 200 follows the header information. As the rich text format stream is being output to the transfer file 210 a MAPI compression technique is used to reduce the size of this data stream. Once the compressed rich text format has been stored within the transfer file 210, each of the temporary files 208a, 208b, and 208c are added to the end of the transfer file.

BBS messages begin with a RFC-850 & RFC-1036 compliant header (with the exception that we terminate each line with a carriage return rather than a carriage return and line feed) followed by a blank line and then the message body. The format of the message body depends on the value of "X-MOS-Format" header field. Possible values are "TEXT", "RTF" and "RTF_COMP".

"RTF_COMP" is the RTF stream from the RichEdit control that has been compressed using the RTF compression supplied by MAPI. WrapRTFCompressedStream is documented in the Windows 32 bit Software Developer's Kit (Win32 SDK) available by license from Microsoft. Messages with attached files are always "IRTF_COMP" formatted. The OLE IStorage for the MOS Attached File (MOSAF) object is encoded in the RTF stream by the RichEdit control. Each attached file is compressed as it is converted into a temporary file and added to the end of the message in the order they appear in the RichEdit control. Thus, the message as it is sent to the server has the following format:
header
blank line
message body
file 1
file2
. . .

file n

The size of the header and body plus the size of each file is sent to the server with the message as discussed above. The server then creates one file to hold the header and body and creates a file for each attached file. After all of the compressed temporary files have been appended to the end of the transfer file 210 it is transmitted via well known means to the BBS server 26 within the host data center 10.

Once the transfer file 210 has been sent to the BBS server 26, it is parsed into the message section and file sections. The message section 220 includes the header portion from the original message and the compressed rich text format stream from the body section of the original message. In addition, each of the compressed files are removed from the transfer file 210 and stored in their own IStorages where a linkage is maintained within the compressed rich text format section of the message to the designation of each associated compressed file. It should be noted that in this system the file data is stored separately from the message IStorage so that the message section 220 can be sent to the client separately from the attached files. Although the message transfer file is a single data storage that is used for transporting messages and files from the client to the network, the files and message body are actually saved in separate storage locations or files once they reach the BBS server 26.

For example, an uploaded file might be 1000 bytes long with a 250 byte header and body section, a 600 byte first appended file and a 150 byte second appended file. The server would then copy the first 250 bytes into the file used to store the header and body. The next 600 bytes would be copied into the file storing the first appended file while the remaining 150 bytes would be copied into the file storing the second appended file. As discussed above, the server is notified of each file size as the message transfer file is uploaded from the client to the BBS server.

The server uses a numerical ID system to store appended files from the message transfer file. The numerical ID is assigned by the server when the upload is completed and functions by assigning consecutive ID numbers to each appended file. Thus, in the example above, if the header and body is assigned ID 4762, the first appended file would be assigned ID 4763, and the second appended file would have ID 4764. On the BBS server, the files containing this data are assigned names that are derived from the ID. In the simple case, the file name could be just the ID, for example a file called 4762. The file name is derived or generated from the ID, and thus always unique.

When the BBS client is initiated, the server supplies a list of messages in the current folder. This list includes the subject of the message, the author, and, for each message, the ID of the message on the server. This is the mechanism used by the client for requesting a particular message. The client transmits a request to open a message having a particular ID number.

Downloading Files

Figure 6:
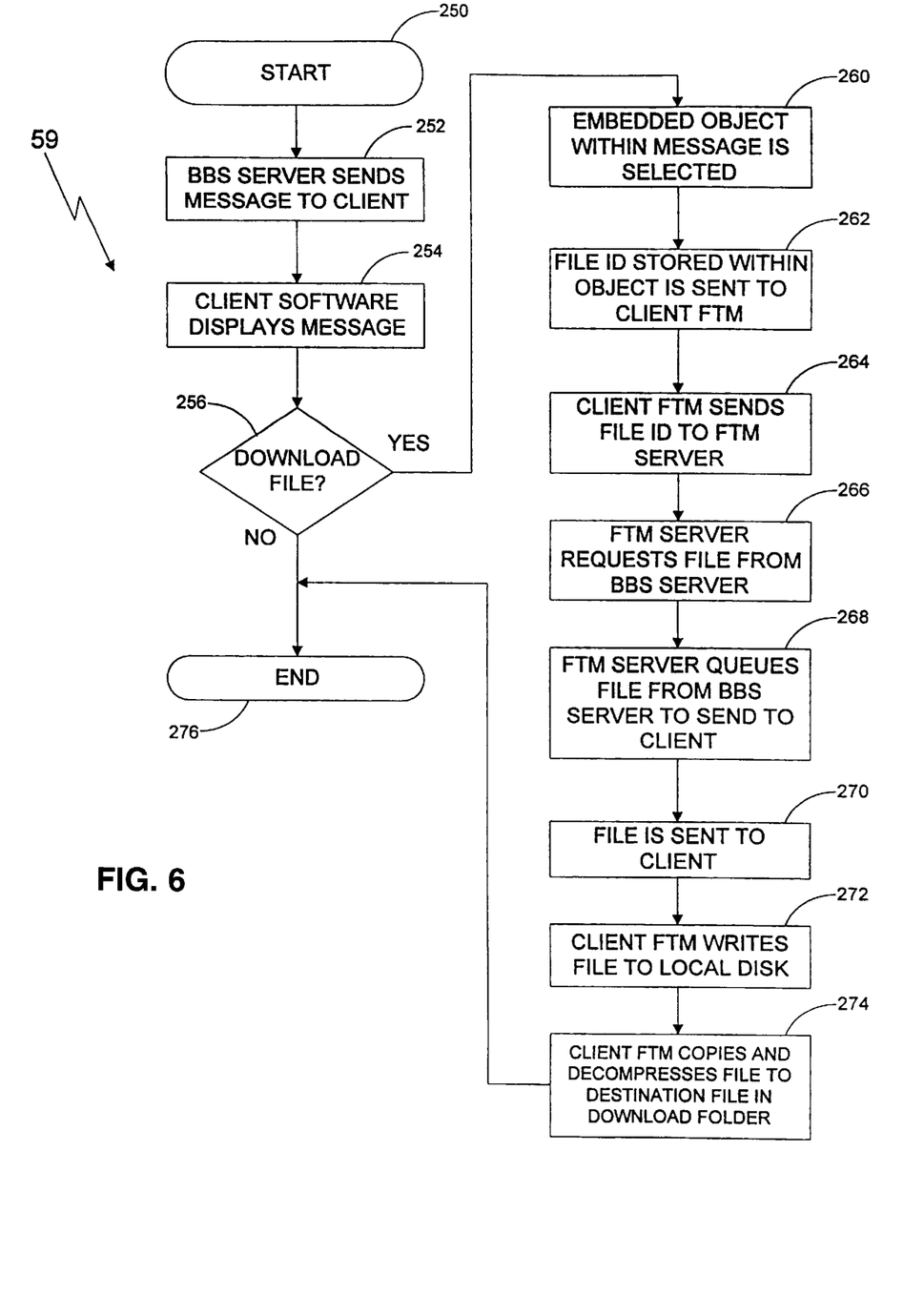
FIG. 6 is a flow diagram illustrating the read message and download files process of FIG. 2.

Referring now to FIG. 6, the process of reading messages and downloading files 59 (FIG. 2) is illustrated in more detail. The process 59 begins at a start state 250 and moves to state 252 wherein the BBS server 26 sends the message 220 (FIG. 5) to the user's (client) computer 14. Once the client computer has received the header and compressed rich text format stream from the BBS server 26 it is converted back into a readable message format as illustrated in message 200 (FIG. 5). The command WrapComressedRTFStream() is first used to decompress the RTF stream and then EM_STREAMIN is run to insert the RTF data into the richedit control of the message body 204.

Once the header and compressed RTF data have been sent to the client computer the client software converts and displays the message at a state 254.

Once the software has been displayed to the user an inquiry is made at a decision state 256 whether or not to download any files referenced by the objects included within the body section 204 of the message 200. It should be noted that at this state only the objects have been downloaded to the client computer while the compressed files remain located on the BBS server. This differs from many prior bulletin board services wherein the entire file is downloaded to the client at this state. Because only the header section and compressed RTF data have been sent to the client it is much faster to read many messages and then select the desired file to be downloaded.

If a determination is made at decision state 256 to download a file then the process 59 moves to a state 260 wherein the user selects an object within the message. Selection of the object can be made by, for instance, double clicking on the icon to indicate to the process 59 that the particular file associated with that object is to be downloaded.

Once the object has been selected, a download window appears which provides information about the file to be downloaded. This information would include, for example, the size of the file, the title of the file, the approximate download time, and perhaps the price of downloading the file to the client computer. The ability for the user to see the size of the file and the approximate download time while within the message window provides an advantage over prior systems which require the user to exit the message window to download a particular file. At this point, the user can decide to cancel the file download or to proceed with retrieving the file. It should be noted that this differs from Email systems wherein double-clicking opens the file associated with the object, but does not open a download window.

As stated above, a price can be associated with the selected file. This ability to set prices for uploaded software could be used as a method for distributing shareware to the public for a reasonable fee. Once a user has downloaded a file which has an associated price, the users account is charged the amount owed for that particular file. The owner of the host data center 10 can thereafter pay the vendor that originally uploaded the file and attain a commission as a service fee.

For example, a particular vendor as shown in FIG. 1 could upload a shareware utility to the host data center 10 which had an associated price of ten dollars. If a client decides to download this file, then the client's account would be charged ten dollars to be collected by the owner of the host data center 10. From this ten dollars, the owner of the host data center might pay the vendor eight dollars and retain two dollars for a service fee. This system provides a very simple and direct method of distributing software from vendors and users while providing benefits for all parties.

The vendor responsible for uploading the software benefits by having its programs available to a wide range of individuals at a very low cost to the vendor. The owner of the host data center has an advantage in retaining service fees and commissions for processing payments while incurring almost no overhead for distributing the software. In addition, the client also benefits by not having to go to a computer store to purchase software. The software can be downloaded directly to the client's computer and thereafter automatically installed. This would be especially advantageous for clients that need software when retailing stores are closed or in a very time dependent manner.

If the client decides to download the selected file once the download window has opened, then a button marked "download" is chosen to initiate the file transfer from the BBS server 26 to the client computer. After the client has selected the download button, the file identification number stored within the MOSAF object is sent to the client file transfer manager 300 (FIG. 7) as indicated at a state 262 of FIG. 6. Once the client file transfer manager (FTM) 300 has received the file identification number at state 262, the client FTM sends the id number to the file transfer manager on the BBS server at a state 264. The file transfer manager server then accesses the host data center through their local network to request the file having the specified id number at a state 266. The BBS server then sends the requested file to the FTM server 24 which queues it for transfer across the wide area network to the client at a state 268. After the file has been queued at the file transfer manager server it is sent to the client at a state 270.

Once the file has been sent to the client at state 270 the client side file transfer manager writes the retrieved file to the local hard disk for storage at a state 272. As discussed above, the file is in a compressed state and must be decompressed before being ready to use by the client. Therefore, the client file transfer manager copies and decompresses the file to a destination file in a download folder at a state 274. At this state, the file has now been decompressed and is ready to be used by the client. The process 59 of downloading the file then terminates at an end state 276. The data structures used during this file transfer from the BBS server to the client are explained in more detail in reference to FIG. 7.

Figure 7:
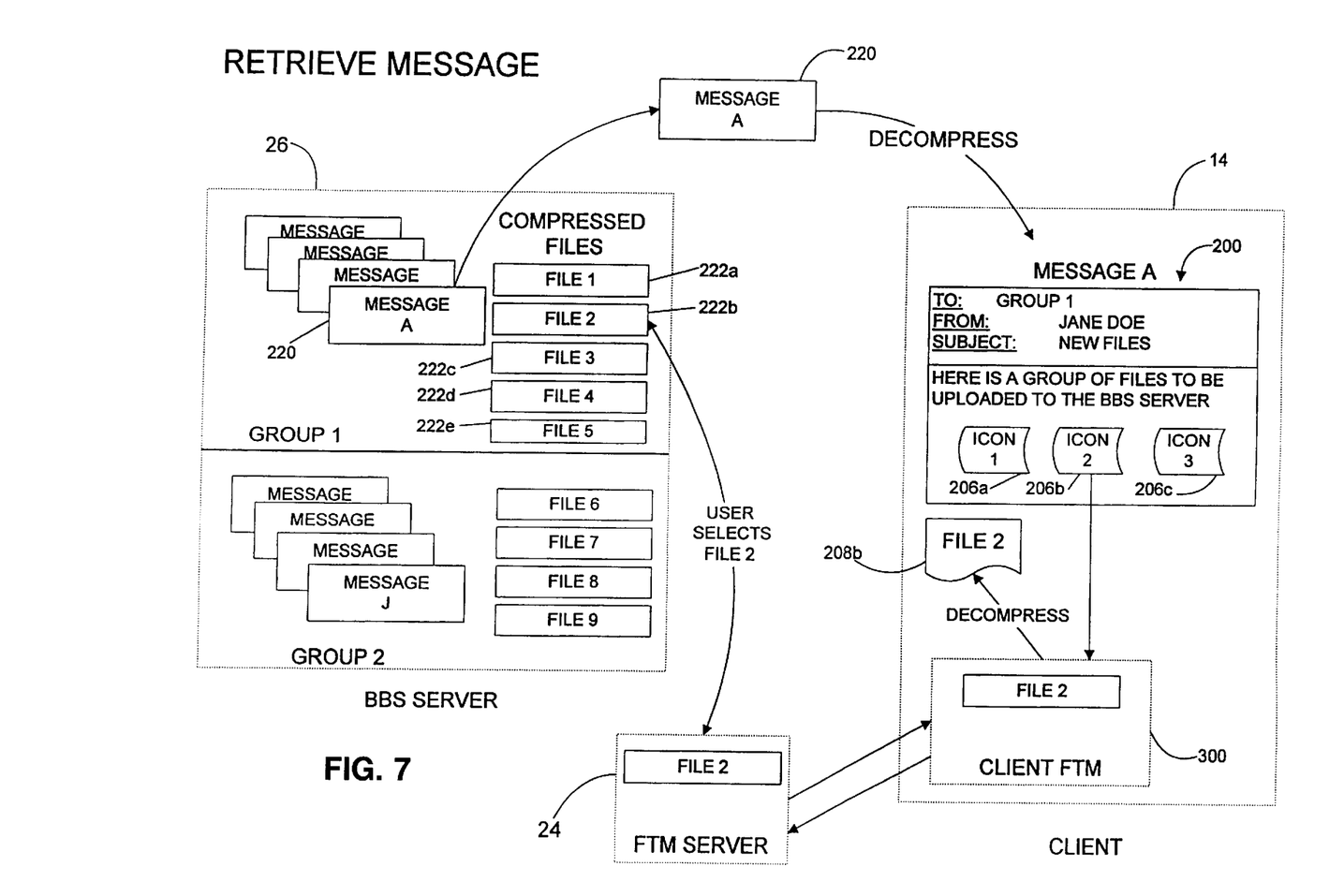
FIG. 7 is a block diagram showing the movement of data structures in the read message and download files process of FIGS. 2 and 6.

The data structures used to retrieve a message are shown in reference to FIG. 7. A BBS server 26 includes a message 220 and a number of compressed files 222. In addition, the BBS server includes a second grouping of messages (group 2) and their associated compressed files. As shown, the client 14 has viewed a message 200 which includes objects 206a, 206b, 206c. By selecting icon 206b the user can initiate a download as explained in reference to FIG. 6 of file 2 from group 1 of the BBS server 26. Once the client has read message 200 and selected icon 206b the file ID that is associated with icon 206b is sent via the client file transfer manager to the file transfer manager server which requests and queues file 222b.

The compressed file 222b is then queued to the file transfer manager server 24 and transmitted to the client file transfer manager 300. After the client file transfer manager 300 has received the compressed file 222b it is decompressed and stored to the client's computer in file 208b. Thus, the user can individually select particular files that are represented by objects from within a BBS message without having to necessarily download every attached file. In addition, time saving techniques such as file compression are used to ensure that the process of posting and retrieving messages is as efficient as possible.

V. CONCLUSION

The present invention provides several advantages over prior bulletin board systems, as discussed above. These advantages include the convenience of being able to include objects representative of files within the BBS message body. Because the actual message does not include any attached data files, throughput of the system of the present invention is very high. A client can browse through many messages without having to spend valuable on-line time waiting for unwanted files to be downloaded.

The present invention can also include file compression techniques that are transparent to the user within the file upload/download process. Transparent file compression alleviates the need for users to compress their files prior to uploading them to a BBS server. Other currently available systems force the user to first compress any files that are to be uploaded to the publicly accessible location on a computer network.

Although the invention has been described with reference to specific embodiments, the description is intended to be illustrative of the invention and is not intended to be limiting. Various modifications and applications may occur to those skilled in the art without departing from the true spirit of the invention as defined in the appended claims.

We claim:

1. In a computer network comprising a first client computer, a second client computer, and a publicly accessible bulletin board server, a method for posting a message and a file to and downloading the file from the bulletin board server, the method comprising the steps of:

creating in the first client computer the message to be posted and inserting a file object representative of the file in the message;

requesting the first computer to post the message to the bulletin board server, and in response, the first client computer recognizing the file object inserted in the message and the first client computer posting the first message to the bulletin board server and automatically uploading the file to the bulletin board server;

displaying the message and a representation of the file object on a display of the second client computer; and downloading the file from the bulletin board server to the second client computer.

2. The method of claim 1 wherein the downloading step comprises the steps of: viewing file information stored in the file object; and selectively transferring the file from the bulletin board server to the second client computer based on the file information.

3. The method of claim 1, wherein the bulletin board server comprises a plurality of networked computers.

4. The method of claim 3, wherein the posting step includes the steps of: transmitting the message and the file in a single information stream; and storing the message and the file on different computers within the plurality of networked computers.

5. The method of claim 1, further comprising the step of automatically compressing the file in response to inserting the file object in the message.

6. The method of claim 1, further comprising the step of automatically decompressing the file in response to the downloading step after the file is stored on the second client computer.

7. The method of claim 1, wherein the message comprises a rich text format.

8. The method of claim 1, wherein the message is part of a message thread.

9. The method of claim 1, wherein the representation of the file object is an icon, and a third client computer input in the downloading step includes selecting the icon; and the downloading step further includes displaying object information relating to the file in response to the selecting of the icon on a display of the third client computer.

10. The method of claim 9, wherein the selecting of the icon comprises the steps of: positioning a pointer on the icon; and actuating an input device.

11. The method of claim 9, wherein the object information includes the size of the file.

12. The method of claim 1, wherein the file object is an object-oriented object.

13. The method of claim 12, wherein the file object includes a data structure and routines to perform operations on a value stored the data structure.

14. The method of claim 12, wherein the file object is a Microsoft On-Line System Attach File (MOSAF) object.

15. The method of claim 1, wherein the file object includes a plurality of attributes, at least one of the plurality of attributes relating to the contents of the file.

16. The method of claim 15, wherein the file object contains an attribute describing the compression method used to compress the file.

17. The method of claim 16, further comprising the step of automatically decompressing the file in response to the downloading step after the file is stored on the second client computer if one of the attributes included in the file object indicates the file was previously compressed.

18. The method of claim 15, wherein the file object contains an attribute describing the size of the file.

19. The method of claim 15, wherein the plurality of attributes include a file ID, and the downloading step includes the steps of: retrieving the file ID from the file object; sending the file ID to the bulletin board server; accessing the file with the file ID on the bulletin board server; and sending the file from the bulletin board server to the second client computer.

20. The method of claim 1, further comprising the steps of:

evaluating the file, in response to inserting the file object in the message, to determine whether the file has or has not been previously compressed; and automatically compressing the file in response to the evaluating step determining the file has not been previously compressed.

21. The method of claim 1, wherein a third client computer input in the downloading of the file includes manipulation of the representation of the file object.

22. A computer-readable medium having computer-executable instructions for performing the steps recited in claim 1.

23. In a computer network comprising a first client computer, a second client computer, and a publicly accessible bulletin board server, a method for posting a message and a file to and downloading the file from the bulletin board server, the method comprising the steps of:

creating in the first client computer the message to be posted and inserting an object-oriented file object representative of the file in the message, the file object having been instantiated from an object class;

requesting the first computer to post the message and the file to the bulletin board server, and in response, the first client computer recognizing the object-oriented file object inserted in the message and the first client computer posting the first message to the bulletin board server and automatically uploading the file to the bulletin board server;

displaying the message and a representation of the object-oriented file object on a display of the second client computer; and downloading the file from the bulletin board server to the second client computer in response to manipulation of the representation of the object-oriented file object.

24. The method of claim 23, wherein the bulletin board server comprises a plurality of networked computers, and the message and the file are stored on different computers within the plurality of networked computers.

25. The method of claim 23, further comprising the step of automatically compressing the file in response to inserting the object-oriented file object in the message.

26. The method of claim 23, further comprising the step of automatically decompressing the file in response to the downloading step after the file is stored on the second client computer.

27. The method of claim 23, wherein the message comprises a rich text format.

28. The method of claim 23, wherein the message is part of a thread.

29. The method of claim 23, wherein the file object includes a data structure and routines to perform operations on a value stored the data structure.

30. The method of claim 23, wherein the file is automatically uploaded, using the object-oriented file object inserted in the message, to the bulletin board server in response to the posting of the message.

31. The method of claim 23, wherein the object-oriented file object contains a plurality of attributes, at least one of the plurality of attributes relating to the contents of the file.

32. A computer-readable medium having computer-executable instructions for performing the steps recited in claim 23.

* * * * *

UNITED STATES PATENT AND TRADEMARK OFFICE
CERTIFICATE OF CORRECTION

PATENT NO. : 5,923,846
DATED : July 13, 1999
INVENTOR(S) : Bruce Gage; Lindsay Harris; Sean Nolan It is certified that error appears in the above-identified patent and that said Letters Patent is hereby corrected as shown below:

In Column 1, line 15: "BBSS," should read --BBSs--

In Column 14, line 54: "IRTF," should read --"RTF--

Signed and Sealed this

Ninth Day of January, 2001

Attest:

Attesting Officer

Q. TODD DICKINSON
Commissioner of Patents and Trademarks